(12) United States Patent
Carper et al.

(10) Patent No.: US 11,875,830 B2
(45) Date of Patent: *Jan. 16, 2024

(54) ADJUSTING HGA Z-HEIGHT VIA HSA ELEVATOR USING HEAD/ACTUATOR FEEDBACK

(71) Applicant: Seagate Technology LLC, Fremont, CA (US)

(72) Inventors: Matthew Aaron Carper, Minneapolis, MN (US); Anil J. Reddy, Minneapolis, MN (US); Brett R. Herdendorf, Mound, MN (US); Riyan Alex Mendonsa, Edina, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,415

(22) Filed: Apr. 25, 2022

(65) Prior Publication Data

US 2022/0254372 A1 Aug. 11, 2022

Related U.S. Application Data

(63) Continuation-in-part of application No. 17/172,684, filed on Feb. 10, 2021, now Pat. No. 11,315,592.

(51) Int. Cl.
*G11B 5/60* (2006.01)
*G11B 5/48* (2006.01)

(52) U.S. Cl.
CPC .......... *G11B 5/6058* (2013.01); *G11B 5/4833* (2013.01)

(58) Field of Classification Search
None
See application file for complete search history.

(56) References Cited

U.S. PATENT DOCUMENTS 4,571,648 A * 2/1986 Barski ...................... G11B 5/54
5,459,921 A 10/1995 Hudson et al.
(Continued)

FOREIGN PATENT DOCUMENTS

JP  2008204561 A * 9/2008 .......... G11B 5/6005
JP  2009151890 A * 7/2009
WO 2020018854 A1   1/2020

OTHER PUBLICATIONS

Application and Drawings for U.S. Appl. No. 17/010,289, filed Sep. 2, 2020, 36 pages.

(Continued)

*Primary Examiner* — William J Klimowicz
(74) *Attorney, Agent, or Firm* — Westman, Champlin & Koehler, P.A.

(57) ABSTRACT

A data storage device (DSD) includes a base-deck, a disc above the base-deck, and a shaft extending perpendicular from the base-deck. The DSD also includes a head stack assembly (HSA) including a head gimbal assembly having a load beam and a head at a first end of the HSA. The head interacts with a surface of the disc. The HSA also includes a second end movably mounted on the shaft. The DSD additionally includes an elevator that linearly moves the HSA along the shaft to adjust a distance between the load beam and the surface of the disc in response to receiving a feedback signal associated with the interaction of the head with the surface of the disc. The feedback signal is one of a plurality of feedback signals employed by the elevator to adjust the distance between the load beam and the surface of the disc.

15 Claims, 6 Drawing Sheets

(56) References Cited

U.S. PATENT DOCUMENTS

| | | | |
|---|---|---|---|
| 5,657,183 A | 8/1997 | Ycas et al. | |
| 5,673,157 A | 9/1997 | Ycas et al. | |
| 5,991,114 A * | 11/1999 | Huang | G11B 21/025 |
| 6,185,993 B1 * | 2/2001 | Schaenzer | G01N 29/045 |
| 6,229,677 B1 | 5/2001 | Hudson et al. | |
| 6,307,719 B1 | 10/2001 | Mallary | |
| 6,568,252 B1 * | 5/2003 | Boutaghou | G11B 5/6005 |
| | | | 73/104 |
| 6,717,776 B2 | 4/2004 | Boutaghou | |
| 6,728,073 B1 | 4/2004 | Budde et al. | |
| 6,747,848 B2 | 6/2004 | Kasajima et al. | |
| 6,914,752 B2 | 7/2005 | Albrecht et al. | |
| 6,963,473 B2 | 11/2005 | Honda et al. | |
| 7,180,692 B1 * | 2/2007 | Che | G11B 5/3948 |
| | | | 360/75 |
| 7,215,495 B1 | 5/2007 | Che et al. | |
| 7,280,305 B2 | 10/2007 | Kwon et al. | |
| 7,292,401 B2 | 11/2007 | Shen et al. | |
| 7,315,436 B1 | 1/2008 | Sanchez | |
| 7,452,213 B2 | 11/2008 | Herdendorf et al. | |
| 7,505,860 B2 | 3/2009 | Herdendorf et al. | |
| 7,509,224 B2 | 3/2009 | Holwell et al. | |
| 7,509,225 B2 | 3/2009 | Anderson et al. | |
| 7,520,168 B2 | 4/2009 | Obergfell et al. | |
| 7,529,635 B2 | 5/2009 | Anderson et al. | |
| 7,542,868 B2 | 6/2009 | Herdendorf et al. | |
| 7,546,216 B2 | 6/2009 | Herdendorf et al. | |
| 7,573,668 B2 | 8/2009 | Kwon et al. | |
| 7,644,493 B2 | 1/2010 | Nayar et al. | |
| 7,684,948 B2 | 3/2010 | Holwell et al. | |
| 7,760,457 B1 * | 7/2010 | Gunderson | G11B 19/042 |
| | | | 360/75 |
| 7,805,830 B2 | 10/2010 | Herdendorf et al. | |
| 8,169,749 B2 | 5/2012 | Keshavan et al. | |
| 8,480,066 B2 | 7/2013 | Anderson et al. | |
| 8,824,094 B1 | 9/2014 | Furlong et al. | |
| 8,861,126 B1 * | 10/2014 | Kang | G11B 21/12 |
| | | | 360/75 |
| 8,958,172 B1 | 2/2015 | Hansen | |
| 8,958,173 B1 | 2/2015 | Hirano et al. | |
| 9,218,833 B1 | 12/2015 | Shah et al. | |
| 10,269,380 B1 | 4/2019 | Sun et al. | |
| 10,622,012 B1 | 4/2020 | Tu et al. | |
| 10,706,879 B2 * | 7/2020 | Garbarino | G11B 5/56 |
| 10,803,891 B1 | 10/2020 | Jacoby et al. | |
| 10,811,045 B2 | 10/2020 | Mendonsa et al. | |
| 10,971,178 B2 * | 4/2021 | Garbarino | G11B 21/12 |
| 11,094,347 B1 | 8/2021 | Herdendorf et al. | |
| 11,120,834 B1 * | 9/2021 | Herdendorf | G11B 5/54 |
| 11,315,592 B1 * | 4/2022 | Carper | G11B 5/6052 |
| 11,348,610 B1 * | 5/2022 | Herdendorf | G11B 5/6058 |
| 11,348,611 B1 * | 5/2022 | Mendonsa | G11B 21/22 |
| 2002/0097514 A1 * | 7/2002 | Boutaghou | G11B 5/60 |
| | | | 360/75 |
| 2005/0022586 A1 * | 2/2005 | Hu | G11B 5/455 |
| | | | 356/600 |
| 2006/0056096 A1 * | 3/2006 | Nakajima | G11B 5/6082 |
| 2006/0245110 A1 * | 11/2006 | Hanchi | G11B 5/607 |
| 2007/0143054 A1 | 6/2007 | Anderson et al. | |
| 2007/0230002 A1 * | 10/2007 | Kassab | G11B 5/6005 |
| | | | 360/75 |
| 2008/0062556 A1 * | 3/2008 | Alexander | G11B 5/455 |
| | | | 360/77.06 |
| 2008/0068742 A1 * | 3/2008 | Kasajima | G01L 9/0082 |
| | | | 29/25.35 |
| 2009/0262460 A1 * | 10/2009 | Hanchi | G11B 5/6005 |
| 2019/0333533 A1 | 10/2019 | Mendonsa et al. | |
| 2020/0027479 A1 | 1/2020 | Myers et al. | |
| 2020/0027480 A1 | 1/2020 | Myers et al. | |
| 2020/0202891 A1 | 6/2020 | Mendonsa et al. | |
| 2020/0227077 A1 | 7/2020 | Sukla et al. | |
| 2020/0381016 A1 | 12/2020 | Liu et al. | |
| 2021/0012797 A1 | 1/2021 | Nguyen et al. | |
| 2021/0020194 A1 | 1/2021 | Nguyen et al. | |
| 2022/0328068 A1 * | 10/2022 | Herdendorf | G11B 5/54 |

OTHER PUBLICATIONS

USPTO-issued prosecution for U.S. Appl. No. 17/172,684, filed Feb. 10, 2021, including: Notice of Allowance and Fees Due (PTOL-85) dated Dec. 30, 2021, 10 pages; and Non-Final Rejection dated Oct. 13, 2021, 10 pages; 20 total pages.

* cited by examiner

ADJUSTING HGA Z-HEIGHT VIA HSA ELEVATOR USING HEAD/ACTUATOR FEEDBACK

This application is a continuation-in-part of U.S. application Ser. No. 17/172,684, filed on Feb. 10, 2021, the content of which is hereby incorporated by reference in its entirety.

SUMMARY

In one embodiment, a data storage device is provided. The data storage device includes a base-deck, and at least one data storage disc located above the base-deck. The data storage device also includes a shaft having an end coupled to the base-deck. The shaft extends perpendicular from the base-deck. The data storage device further includes a head stack assembly (HSA) including at least one head gimbal assembly (HGA) having a load beam and a head positioned at a first end of the HGA/HSA. The head interacts with a surface of the at least one data storage disc. The HSA also includes a second end that is movably mounted on the shaft. The data storage device additionally includes an elevator configured to linearly move the HSA along the shaft to adjust a distance between the load beam and the surface of the at least one data storage disc in response to receiving a first feedback signal from a piezoelectric sensor in the HSA.

In another embodiment, a data storage device is provided. The data storage device includes a base-deck, and at least one data storage disc located above the base-deck. The data storage device also includes a shaft having an end coupled to the base-deck. The shaft extends perpendicular from the base-deck. The data storage device further includes a head stack assembly (HSA) including at least one head gimbal assembly (HGA) having a load beam and a head positioned at a first end of the HGA/HSA. The head interacts with a surface of the at least one data storage disc. The HSA also includes a second end that is movably mounted on the shaft. The data storage device additionally includes an elevator configured to linearly move the HSA along the shaft to adjust a distance between the first load beam and the surface of the at least one data storage disc as a function of a plurality of different feedback signals from different sources.

In yet another embodiment, a data storage device is provided. The data storage device includes a base-deck, and at least one data storage disc located above the base-deck. The data storage device also includes a shaft having an end coupled to the base-deck. The shaft extends perpendicular from the base-deck. The data storage device further includes a head stack assembly (HSA) including at least one head gimbal assembly (HGA) having a load beam and a head positioned at a first end of the HGA/HSA. The head interacts with a surface of the at least one data storage disc. The HSA also includes a second end that is movably mounted on the shaft. The data storage device additionally includes an elevator configured to linearly move the HSA along the shaft to adjust a distance between the load beam and the surface of the at least one data storage disc in response to receiving a Wallace spacing feedback signal.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure generally relate to moving a head stack assembly (HSA) up/down in an operating data storage device (e.g., a hard disc drive (HDD)) to adjust head gimbal assembly (HGA) z-height, which is a distance between a load beam of the HGA and a surface of a disc directly above/below the load beam. Such embodiments may be especially useful in "elevator" drives in which a number of heads employed may be less than a number of disc surfaces, and the HSA including the fewer number of heads is moved up/down to enable a same head to read from or write to multiple disc surfaces. Once the head is coarsely positioned over a particular disc surface, embodiments of the disclosure may be employed to make fine adjustments to the z-height by moving the elevator small distances up/down in response to one or more different feedback signals, which are described further below. It should be noted that embodiments of the disclosure may also be employed in data storage devices (e.g., HDDs) in which the number of heads employed are equal to the number of disc surfaces. Prior to providing a detailed description of the different embodiments, examples of elevator drives are described below in connection with FIGS. 1A and 1B.

Figure 1A:
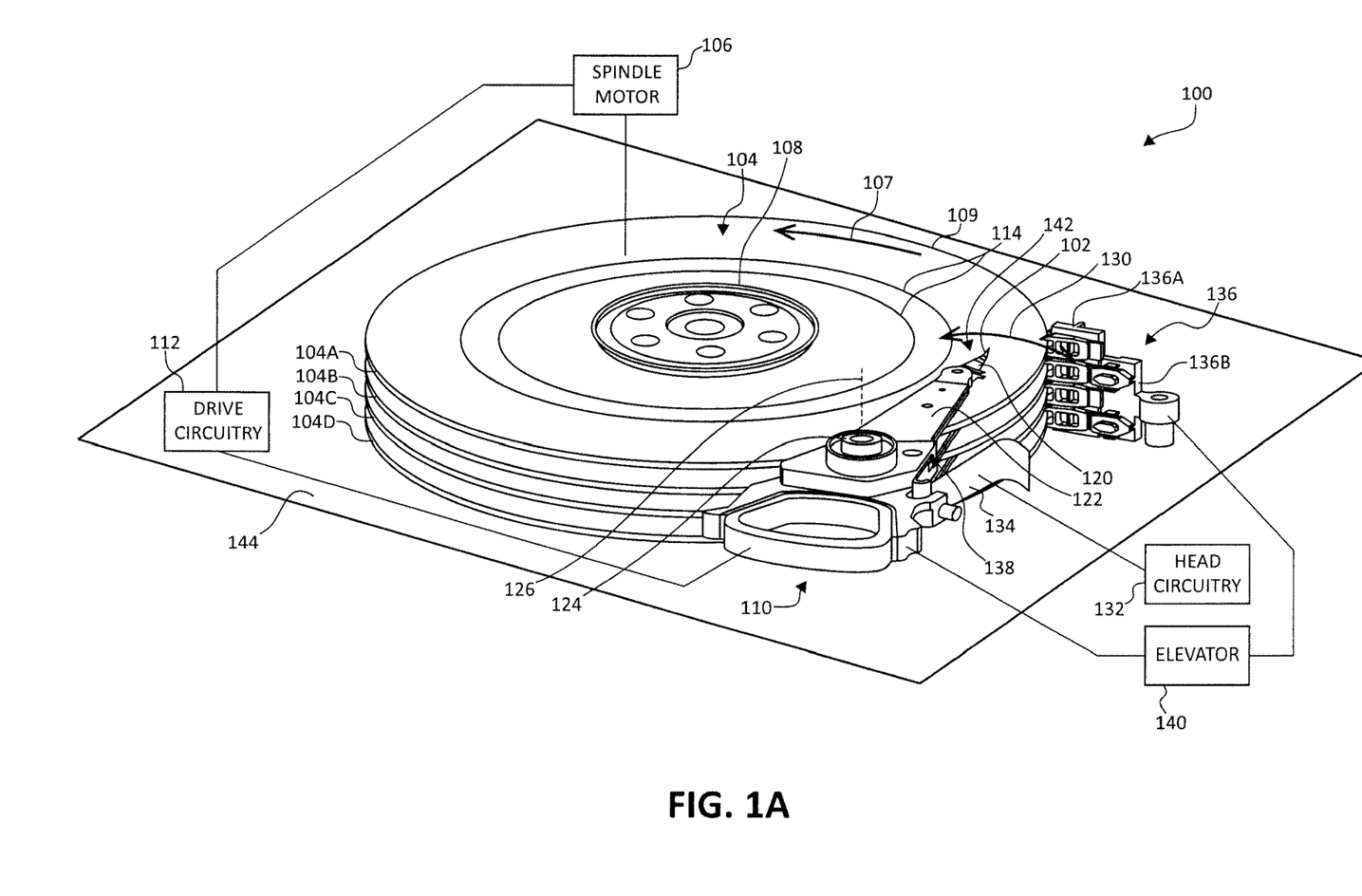
FIG. 1A is a schematic illustration of a data storage device in accordance with one embodiment.
Figure 1B:
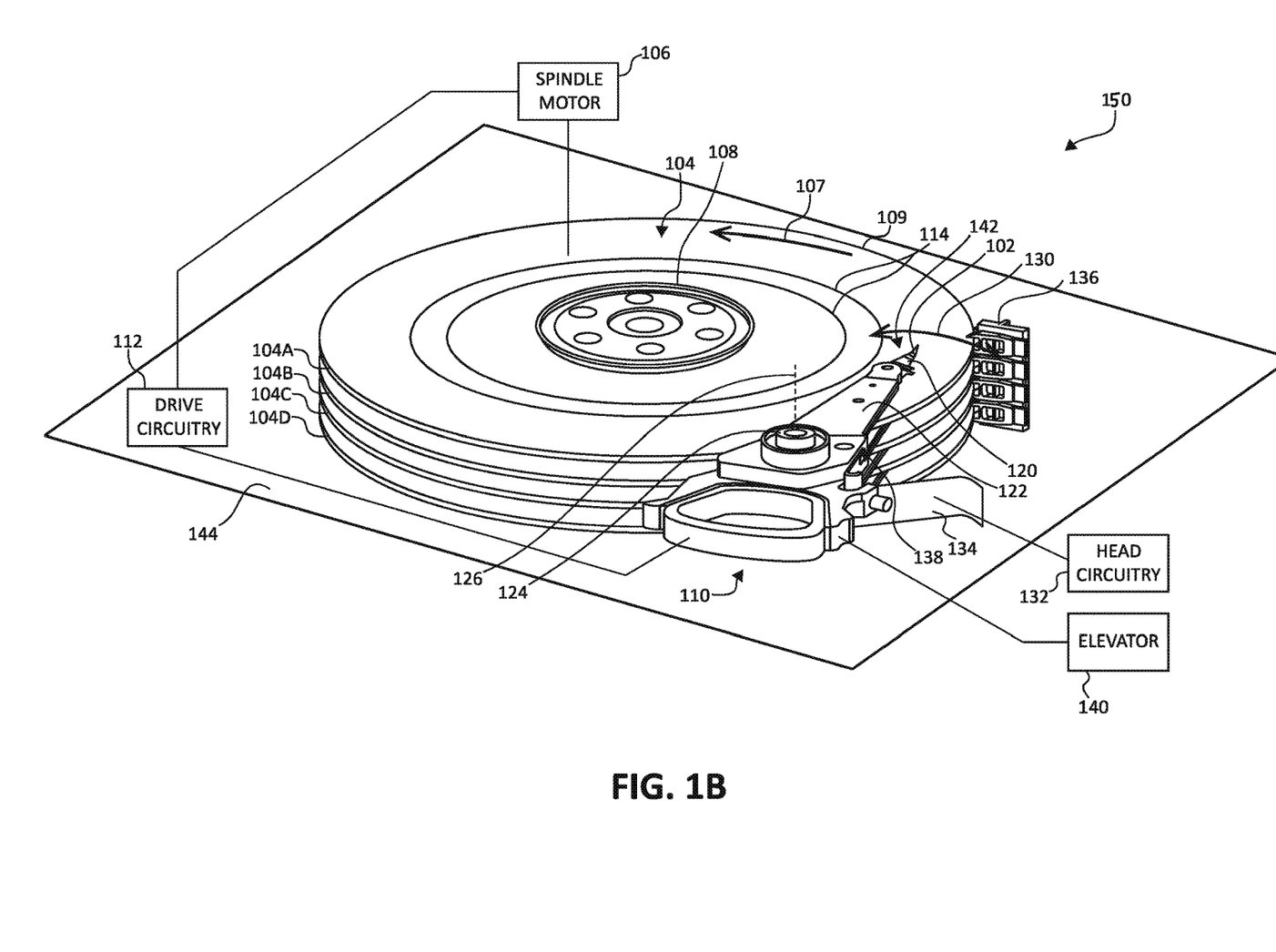
FIG. 1B is a schematic illustration of a data storage device in accordance with another embodiment.

FIGS. 1A and 1B show illustrative operating environments in which certain embodiments disclosed herein may be incorporated. The operating environments shown in FIGS. 1A and 1B are for illustration purposes only. Embodiments of the present disclosure are not limited to any particular operating environments such as the operating environments shown in FIGS. 1A and 1B. Embodiments of the present disclosure are illustratively practiced within any number of different types of operating environments.

It should be noted that same or like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1A is a schematic illustration of a data storage device 100 including data storage media, a head stack assembly (HSA) including heads for reading data from and/or writing data to the data storage media, a split ramp for supporting the heads, and an elevator for moving the HSA and a portion of the split ramp in accordance with one embodiment. In data storage device 100, heads 102 may be positioned over storage media 104 to read data from and/or write data to the data storage media 104. In the embodiment shown in FIG. 1A, the data storage media 104 are rotatable data storage discs, with each disc 104 having opposing surfaces that serve as data storage surfaces. For read and write operations, a spindle motor 106 (illustrated schematically) rotates the media 104 as illustrated by arrow 107 and an actuator mechanism (e.g., a voice coil motor (VCM) actuator) 110 positions the heads 102 relative to data tracks 114 over the rotating media 104 between an inner diameter (ID) 108 and an outer diameter (OD) 109. Both the spindle motor 106 and actuator mechanism 110 are connected to and operated through drive circuitry 112 (schematically shown). Each of heads 102 is coupled to the actuator mechanism 110 through a suspension assembly which includes a load beam 120 connected to an actuator arm 122 through, for example, a swage connection. The actuator mechanism 110 is rotationally coupled to a frame or base-deck 144 through a bearing 124 to rotate about axis or shaft 126. Rotation of the actuator mechanism 110 moves the heads 102 in a cross-track direction as illustrated by arrow 130. Each of the heads 102 includes one or more transducer elements (not shown in FIG. 1A) coupled to head circuitry 132 through flex circuit 134.

In general, in order to keep read/write heads 102 from landing on discs 104 in data storage device 100 when, for example, power is removed from the data storage device 100, and to prevent the heads 102 from colliding with outer edges of the discs 104 during load and unload operations, a head-support ramp 136 is provided adjacent to the OD 109 of the discs 104. In data storage device 100, a number of heads 102 is less than a number of disc 104 surfaces. In the particular embodiment shown in FIG. 1A, data storage device 100 includes 4 discs, with a total of 8 data storage surfaces, and 4 heads 102. As noted above, each of the 4 heads 102 is coupled to the actuator mechanism 110 through a suspension assembly which includes a load beam 120 connected to an actuator arm 122. The load beams 120, the actuator arms 122, and gimbals (not shown in FIGS. 1A and 1B) are collectively referred to as the HSA, which can include one or more heads 102. An individual load beam 120, actuator arm 122, gimbal and head 102 constitute a HGA.

In data storage device 100 of FIG. 1A, the HSA, which is denoted by reference numeral 138, may be moved along axis or shaft 126 between an upper position and a lower position with the help of an elevator 140, which is schematically shown in FIG. 1A. In the upper position shown in FIG. 1A, the 4 heads may interact with data storage surfaces of discs 104A and 104B. In the lower position (not shown), the same 4 heads may interact with data storage surfaces of discs 104C and 104D.

In order to enable the up/down movement of the HSA 138, head-support ramp 136 is designed as a split ramp with a stationary portion 136A and moveable portion 136B. To move the HSA 138 from either the upper position to the lower position or from the lower position to the upper position, the HSA 138 is first rotated about axis 126 by actuator 110 until a head end 142 of the HSA 138 is supported on the moveable portion 136B of the head-support ramp 136. Then, the HSA 138 and the moveable portion 136B are moved up/down in unison by the elevator 140. It should be noted that, in some embodiments, ramp 136 may be a single unit that can be retracted away from the discs 104 to enable up/down movement of the HSA 138 and the entire ramp 136 by the elevator 140. In general, any suitable type of elevator 140 mechanism (e.g., coil-permanent magnet assemblies that enable linear movement, shape memory alloy (SMA) wires suitably connected for raising/lowering the HSA, etc.) may be employed. In the interest of brevity, individual elements of elevator 140 are not shown and described.

In some embodiments, the HSA 138 and the moveable ramp portion 136B vertical position control (e.g., elevator 140 control) may utilize either a "bang-bang" control or an optical encoder. In the former, the HSA 138 is positioned at an uppermost position (where an upper stopper (not shown) proximate to a top cover (not shown) of data storage device 100 stops upward travel of the HSA 138) or a lowermost position (where a lower stopper (not shown) proximate to a base-deck 144 of data storage device 100 stops downward travel of the HSA 138). For the latter, an optical encoder (not shown in FIGS. 1A and 1B) provides positional feedback for adjusting a vertical position of elevator 140. Fine positioning of elevator 140 may be carried out in a manner described further below.

FIG. 1B is a schematic illustration of a "fully populated" data storage device 150 in which the number of heads is equal to the number of disc surface (e.g., for 4 discs: 8 heads for the 8 disc surfaces). In such an embodiment, ramp 136 may be a single unit and may be fixed. Therefore, elevator 140 is not connected to the ramp 136 in data storage device 150 of FIG. 1B. In data storage device 150, elevator 140 is utilized to carry out fine vertical adjustments in a manner described further below. Since the remaining elements of data storage device 150 are similar to the elements of data storage device 100 of FIG. 1A, a description of those elements are not repeated.

Figure 1C:
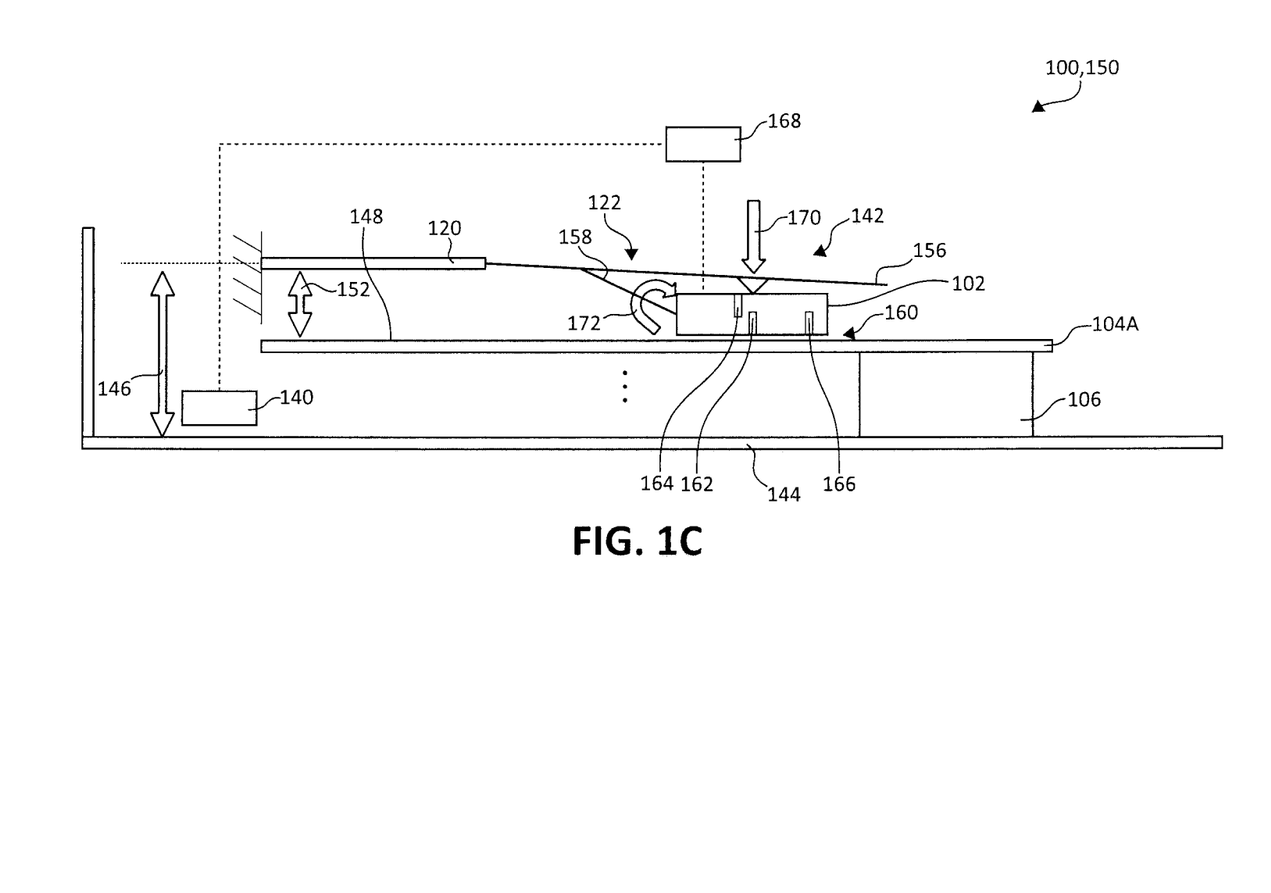
FIG. 1C is a schematic illustration of a first portion of the data storage device of FIG. 1A/1B.

FIG. 1C is a simplified block diagram of a portion of data storage device 100, 150 showing load beam 120 positioned over an upper surface 148 of disc 104A. In the interest of simplification, the remaining discs and several other elements of data storage device 100, 150 are not shown in FIG. 1C. The position of load beam 120 relative to base-deck 144, which is dependent on the position of the HSA 138 (shown in FIGS. 1A and 1B) relative to the base-deck 144, is denoted by reference numeral 146 in FIG. 1C. The z-height, which is the distance between load beam 120 and disc surface 148, is denoted by reference numeral 152. Actuator arm or suspension arm 122 is connected to load beam 120 and has a lift tab 156 at its distal/head end 142. A gimbal 158 is coupled to suspension 122, and head 102 is coupled to gimbal 158. During operation, head 102 flies close to the disc surface 148 (e.g., by an air bearing created by the high speed rotation of the disc 104A) at a fly height (FH) 160. Head 102 may include transducer elements (e.g., reader(s)/writer(s)) 162 to read data from and/or write data to disc surfaces such as 148. Head 102 may also include heaters or other fine positioning systems 164 to cause the transducer element(s) 162 to protrude closer to the disc surface 148, thereby providing a desired head-media spacing (HMS) for the transducer(s) 162 to suitably carry out read/write operations. Head 102 may also include one or more sensors 166 (e.g., a temperature coefficient of resistance sensor). Feedback signals obtained from different elements of head 102 and/or actuator 110 (shown in FIGS. 1A and 1B) are obtained by feedback circuitry 168 and provided to elevator 140, which may responsively move HSA 138 (of FIGS. 1A and 1B) to control z-height 152. Prior to providing details regarding z-height 152 control, a background and potential impact of z-height control are provided below.

Certain HDD designs have had failure modes related to head resonance and modulation fail modes that have been traced back to drive-level z-height 152 being off-target. Fail modes that may be impacted by a deviation from nominal z-height include head resonance and head modulation. A shift in z-height 152 directly impacts pitch static attitude and preload (gimbal vertical stiffness multiplied by z-height change) 170 of the head. These changes directly impact pitch torque 172 and vertical forces experienced by each head 102 while flying above the disc 104A. Alterations in the pitch torque 172 and the vertical force experienced by each head 102 may lead to either/both head resonance or/and change in fly attitude.

A second problem related to z-height 152 variability in the HDD is the loss of OD disc recording real estate owing to HGA lift tab 156 contact with the load/unload ramp (e.g., 136 of FIGS. 1A and 1B). Early contact of lift tab 156 with the ramp 136 will limit the extent of useable OD tracks (for recording). If the z-height 152 can be adjusted, then lift tab 156 contact to the ramp 136 can occur later (more towards the OD (109 of FIGS. 1A and 1B)), and higher on the ramp 136, adding more recording tracks, and ultimately increasing drive capacity.

Direct measurements of z-height 152 in certain HDD designs has revealed z-height 152 shifts in drive assembly. These z-height 152 shifts may be exacerbated due to variation in media lot thicknesses. It should be noted that other factors such as HSA tilt and/or disc tilt, the presence of burrs or other debris that effectively shift the HSA up, etc., may also contribute to the z-height being off target. In general, variance of dimensions of drive components such as discs and spacers as well as HSA installation may contribute to z-height shifts.

The ability to control z-height 152 within the HDD, and after assembly, adds margin against modulation and resonance failure modes as well as head fly height sensitivity to environmental changes, and increased drive capacity by accessing more OD tracks. Examples of environmental changes are the loss of helium from within the HDD through leakage or consumption of oxygen, which change the gas composition in the HDD over the life of the HDD (in the field). These performance considerations are all directly impacted by pitch torque 172 and preload 170 applied to the head 102 by the gimbal 158 assembly according to z-height 152. This is how a shift in z-height 152 impacts the pitch orientation of the head/slider, the air bearing flyability and ultimately HMS.

However, as implied above, it may not be sufficient to know the position of the HSA 138 relative to the base-deck 144, owing to variations in disc thickness, stack twist, stack tilt, etc. Indeed, it is common to observe significant variation from, for example, a bottom-most head to a top-most head with even-odd tab offsets characteristic of a z-height 152 shift.

Embodiments of the disclosure utilize any of the aforementioned head spacing concepts to actuate the HSA 138 to adjust the individual z-height 152 with feedback from, for example, field adjust fly height (FaFH) algorithms. In one embodiment, positioning of the HSA may be carried out as follows:

(1) With the heads 102 off disc (lift tab 156 on ramp 136), the HSA 138 and ramp 136 elevator 140 may employ optical encoder feedback or any other suitable feedback to arrive at the desired vertical position; this gets the HSA 138 to the desired base-deck 144 to load beam 120 dimension 146.

(2) Next, the heads 102 are loaded onto the disc(s) 104. The elevator 140 is finely positioned to adjust z-height 152 based on at least one of three different feedback data/signals: a) head heater power to contact (e.g., heater actuation until contact with the disc 104A is detected), b) reader-based feedback, or c) detected resonance. Head heater power to contact involves incrementally applying power to a heater positioned within the head and using the thermal expansion of head materials to decrease head clearance to the disc until contact is made. The power is typically incremented from zero. However, an initial value other than zero may also be used. An initial power step applied to the heater may be relatively large (for example, 30 milliwatts (mW)) because, in most designs, contact will not result with the application of the relatively large initial power step. After the application of the initial power step, the power applied to the heater is subsequently incremented in smaller steps (e.g., 0.5 mW) until contact is detected. Here, any suitable method for head-disc contact detection may be employed. For example, acoustic emission signals or servo signals may be utilized for contact detection. When acoustic emission is employed for contact detection, an acoustic emission sensor in the head or coupled to the head may be utilized to determine changes in fundamental and/or harmonic frequencies that are indicative of head-disc contact. Also, servo signals read by the head may be employed to detect, for example, head position changes that are a consequence of head-disc contact. Change in power to contact indicates a change in clearance. Reader-based feedback algorithms may employ the Wallace spacing equation; this uses a written triple harmonic magnetic pattern and readback amplitude signal to calculate changes in HMS. Resonance can be detected through measured servo frequency response function or in some cases head-media spacing modulation measured by a head temperature coefficient of resistance (TCR) sensor signal that is dependent on spacing between sensor and the media. In the embodiment of FIG. 1C, the feedback signal(s)/data are generated/obtained by circuitry 168, and provided to elevator 140, which carries out the fine positioning of the HSA 138 to adjust the z-height 152 based at least in part on the received feedback signal(s)/data.

In fully-populated HDDs, a nominal position of the elevator 140 (e.g., the position of the elevator as shipped to the customer) could, for example, be set to achieve a desired average head FH, or to set FH to reduce the average reader temperature when heater operational power is applied during active FH management.

In the field, the (active) spacing of the head may be continuously monitored (by circuitry 168) for changes relative to the clearance set during drive calibration (e.g., certification in the factory, following manufacture), or it can be checked at set time intervals, or upon detection of a change in environment (e.g., pressure, humidity, temperature). For these monitor applications, using reader (Wallace spacing) feedback may be suitable, as it will indicate if there are spacing changes relative to the HMS used during drive calibration in the factory.

In some embodiments, the z-height 152 for the active head 102 in the drive (e.g., the head 102 performing the current read/write operation) is tuned. Stated another way, the HSA 138 position can be adjusted for each individual head-disc interface according to which interface is being written or read. Alternatively, there could be a predetermined elevator position for up-facing heads, and a different predetermined position for down-facing heads. This would add some latency to data access owing to the time required to shift the elevator position; there may be some use cases where this latency would be allowable owing to data buffers (use cases where data is streaming, surveillance, etc.)

Similar head adjustments could be made, with the aforementioned FH, resonance, or power-to-contact feedback, using other head actuation schemes using for example, but not limited to, the head heater(s) or other mechanical actuators co-located at the head. It is also noted that the feedback may not be limited to reader feedback, and could utilize, for example, TCR sensor 166 feedback. TCR sensors are based on the principle of resistance change due to temperature change. Temperature changes as a function of spacing or FH owing to pressure changes in the air proximal to the exposed sensor. As indicated above, other forms of feedback on head-disc contact or feedback on the change in head-disc gap include acoustic emission, as detected by an acoustic emission sensor, or cross track position change, measured by the reader, that is the consequence of head-disc contact. Also, as indicated above, elevator 140 may linearly move the HSA 138 along the shaft 126 to adjust a distance between the load beam 120 and the surface 148 the data storage disc 138 in response to receiving a feedback signal indicative of close proximity, or contact, between the lift tab 156 and the front end of the ramp when the head 102 approaches the OD 109.

Figure 1D:
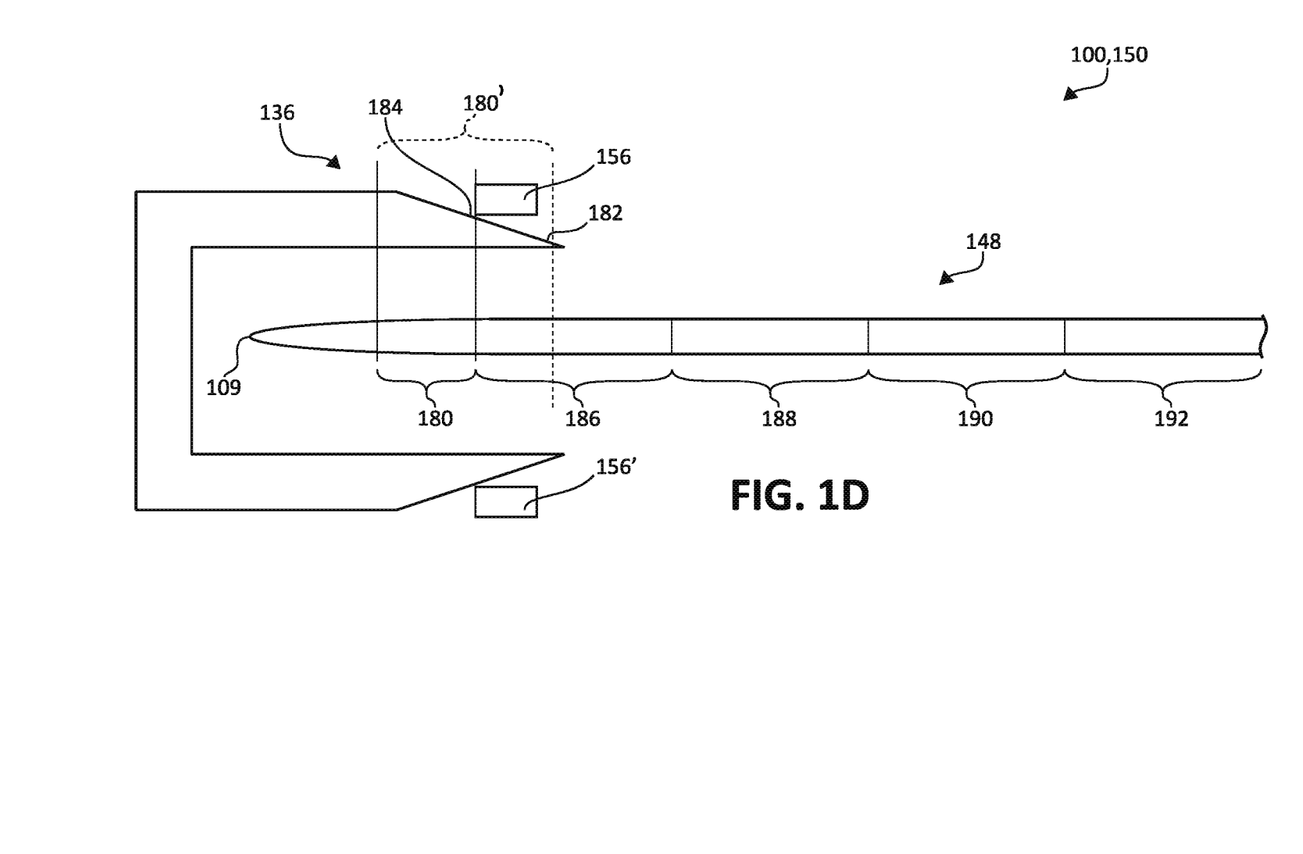
FIG. 1D is a schematic illustration of a second portion of the data storage device of FIG. 1A/1B.

FIG. 1D is a diagrammatic illustration of a portion of data storage device 100, 150 showing an impact of z-height adjustments on the ability to record data proximate to the OD 109. In the embodiment shown in FIG. 1D, data storage surface 148 include a guard band zone 180, which is designated as a no-data storage zone in the load/unload area to reduce data loss or damage in the load/unload area below the ramp 136. Without the ability to adjust the z-height in accordance with embodiments of the disclosure, close proximity or initial contact between the lift tab 156 and the ramp 136 would be detected at, for example, location 182 of ramp 136, and no recording of data would be carried out near and beyond that location toward the OD 109, thereby making the guard band larger (e.g., 180'). Thus, in accordance with embodiments of the disclosure, feedback from the head 102 (e.g., modulation) and/or actuator 110 (e.g., torque discontinuity) indicative of close proximity or initial contact between the lift tab 156 and the ramp 136 is provided to elevator 140, which responsively moves the HSA 138 to adjust the z-height 152 such that lift tab 156 contact to the ramp 136 can occur higher on the ramp 136 (e.g., at location 184), adding more recording tracks, and ultimately drive capacity. Regions 186, 188, 190 and 192 are examples of data storage zones on the disc surface 148. In some embodiments, a different z-height may be employed for each different zone 186, 188, 190 and 192 to, for example, provide different recording densities. Also, z-height may be altered to enable data recovery when the disc surface 148 experiences degradation. It should be noted that, although not shown in FIG. 1D, head 102 is aligned with lift tab 156. In other words, both the lift tab 156 and the head 102 are at the same radial position on the disc 104A (or, more generally, the lift tab 156 and the head 102 are a fixed radial distance apart, and that distance is equal to (or substantially equal to) zero). The lift tab on the opposite side of the disc 104A is denoted by 156'.

Figures 2A, 2B:
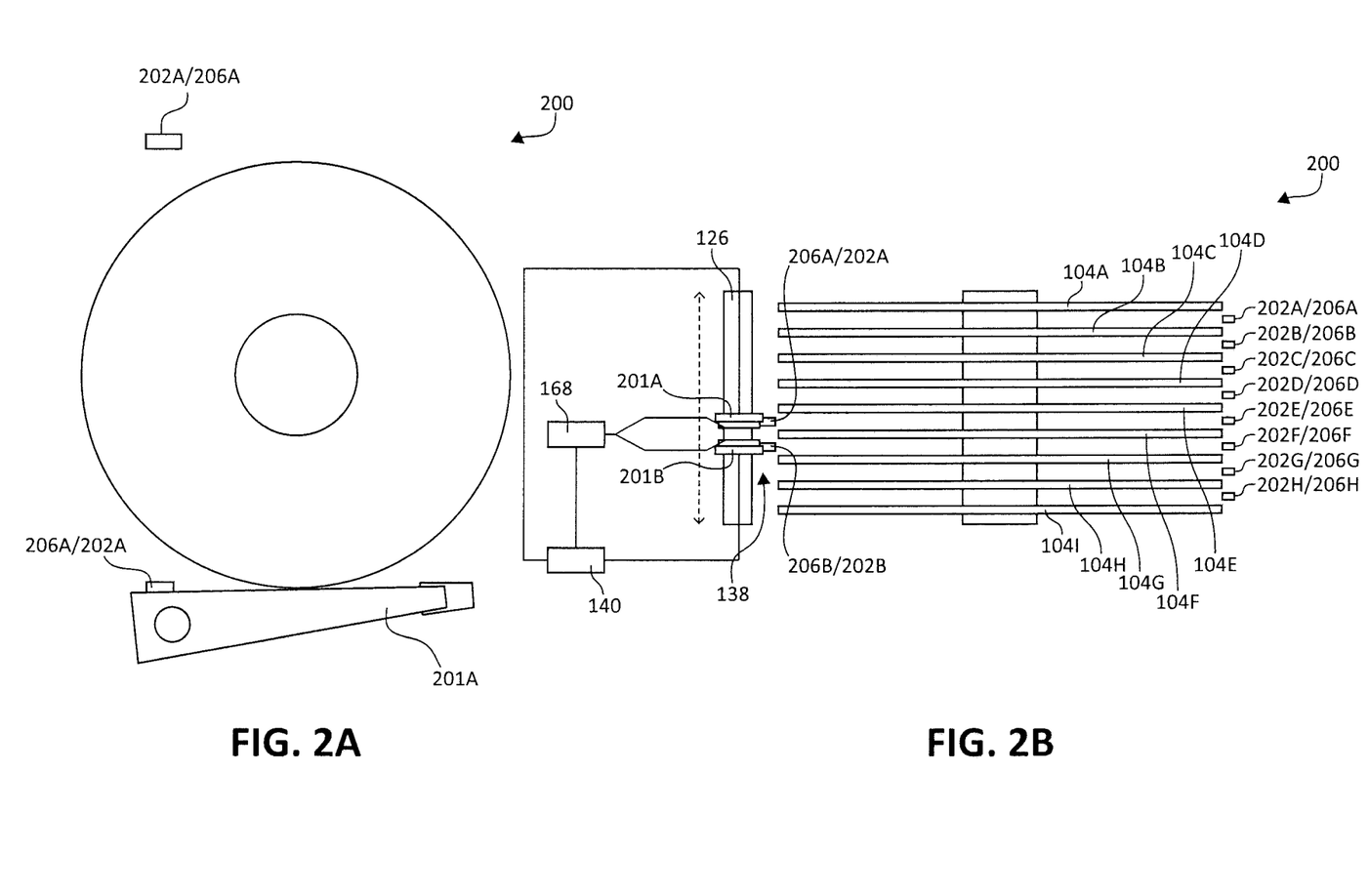
FIGS. 2A and 2B together illustrate a feedback system for positioning an elevator in accordance with one embodiment.

FIGS. 2A and 2B are diagrammatic illustrations that show top and side views, respectively of a data storage device 200 that employs a coarse positioning system and multiple fine positioning systems for HSA 138 including HGAs 201A and 201B. In one embodiment, transmitters 202A and 202B may be coupled to HGAs 201A and 201B, respectively, and receivers 206A-206H may be positioned on an opposite side of discs 104A-104I. In the interest of simplification support structures for the receivers 206A-206H are not shown. In an alternate embodiment, receivers 206A and 206B may be coupled to HGAs 201A and 201B, respectively, and transmitters 202A-202H may be positioned on an opposite side of discs 104A-104I. In general, the transmitters and receivers may be positioned at any different suitable locations in different embodiments. In some embodiments, each of elements 202A-202H may be an optical source. In other embodiments, elements 202A-202H may not each be optical sources. For example, a separate single optical source (not shown) or two optical sources (each providing a different optical frequency signal) (not shown) may provide optical signals to, some or all of elements 202A-206H via optical fibers. Alternatively, elements 202A-202H may be mirrors that reflect signals from the separate optical source(s) or light pipes such as optical fibers.

In the embodiment of FIGS. 2A and 2B, coarse positioning of HSA 138 including HGAs 201A and 201B along shaft 126 may be carried out in any suitable manner. For example, to carry out coarse positioning (e.g., to bring actuator arms HGAs 201A and 201B from the bottom of shaft 126 to disc 104F as shown in FIG. 2B) the HSA 138 including the HGAs 201A and 201B may simply be moved using a count of 4 discs in an upward direction. Once the HGAs 201A and 201B are coarsely positioned at disc 104F, and if HGA 201A includes attached receiver 206A and HGA 201B includes attached receiver 206B, first fine movement of the HSA 138 including the HGAs 201A and 201B along shaft 126 may take place until signals sent from transmitters 202E and 202F are received by receivers 206A and 206B, respectively. The movement of the HSA 138 along the shaft 126 may be stopped when the respective received signals or combination of signals are at or above a predetermined strength. An elevator 140 may be employed to direct or control certain aspects the coarse and first fine positioning operations. Additionally, second fine positioning may be carried out with the help of feedback circuitry 168 coupled to heads 102 and to elevator 140 in a manner described above in connection with FIGS. 1C and 1D.

The above-included description in connection with FIGS. 2A and 2B relates to optical feedback/encoding systems for first fine positioning of an elevator. However, in different embodiments, non-optical encoders such as magnetic encoders may instead be utilized for first fine positioning of an elevator. Other examples of non-optical encoders/positioning systems include, resistance, inductive, capacitive, tactile using piezoelectric elements or limit switches or other electro mechanical systems.

Additional or alternative types of sensors may also be employed for fine positioning operations described above in connection with FIGS. 1C and 1D. For example, one or more piezoelectric sensors may be employed in a manner described below in connection with FIG. 3.

Figure 3:
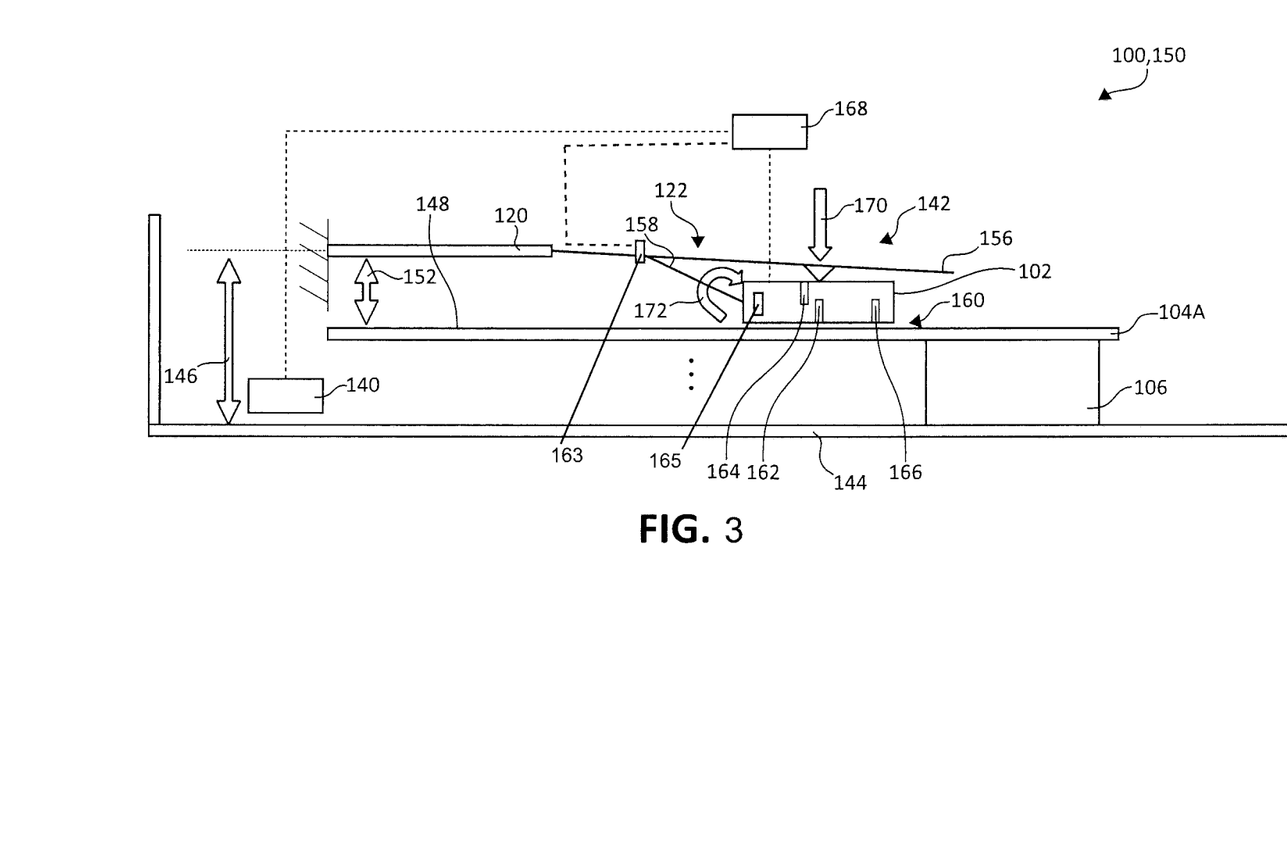
FIG. 3 is a simplified block diagram of a portion of data storage device with piezoelectric sensor in accordance with one embodiment.

FIG. 3 is a simplified block diagram of a portion of data storage device 100, 150 with an actuator arm and/or a head including a piezoelectric sensor in accordance with one embodiment. In the interest of brevity, elements of FIG. 3 that are similar to previously-described elements in FIG. 1C are not described again in connection with FIG. 3. In the embodiment of FIG. 3, actuator arm 122 includes a first piezoelectric sensor 163, and head 102 includes a second piezoelectric sensor 165. It should be noted that, in some embodiments, instead of including both piezoelectric sensors 163 and 165, either first piezoelectric sensor 163 or second piezoelectric sensor 165 may be included. It should be noted that, in general, piezoelectric sensors 163 and 165 may be at any suitable location. Also, any suitable number of piezoelectric sensors may be used. For example, piezoelectric sensor 165 or an additional piezoelectric sensor (not shown) may be in the region below arrow 170 (shown as a triangle in FIG. 3) or at any other suitable location. Also, other types of sensors (e.g., thermosensitive sensors) may be employed.

In one embodiment, first piezoelectric sensor 163 may be a piezoelectric micro-actuator that is employed to make fine position adjustments to a portion of actuator arm 122. Additionally, piezoelectric micro-actuator 163 senses close proximity, or contact, between lift tab 156 and a front end of ramp 136 (shown in FIG. 1D) when the head 102 approaches the OD 109 (shown in FIG. 1D). A resulting measurement/signal from piezoelectric micro-actuator 163 is obtained by feedback circuitry 168, and provided to elevator 140, which may responsively move HSA 138 (of FIGS. 1A and 1B) to control z-height 152.

Second piezoelectric sensor 165, which may be coupled to or located within head 102, generates a signal that is dependent on spacing between head 102 and data storage medium 104A when the head 102 interacts with the data storage medium 104A. In the embodiment of FIG. 3, the feedback signal from piezoelectric sensor 165 is obtained by circuitry 168, and provided to elevator 140, which carries out the fine positioning of the HSA 138 to adjust the z-height 152 based at least in part on the received feedback signal. As noted above, different types of sensors (e.g., thermosensitive sensors) or combinations of different types of sensors may be employed.

As indicated above, a number of different feedback signals from a number of different sources may be employed by elevator 140 to carry out fine positioning of the HSA 138 to adjust z-height 152. For example, to position the HSA 138, elevator may employ a coarse measurement signal for a first source and a fine measurement signal from a second source. The coarse measurement signal may be from a HSA position encoder, an optical measurement feedback system, etc. The fine positioning signal(s) may be from piezoelectric sensors of the type described above in connection with FIG. 3. In some embodiments, feedback signals from sensors included in, on, or proximate to, HGAs on opposing sides of a data storage disc such as 104A may be employed by elevator 140 to balance HMS on either side of the data storage disc 104.

As indicated earlier, a Wallace spacing feedback signal may be employed by the elevator 140 to adjust the distance between the load beam and the surface of the at least one data storage disc. In some embodiments, each disc (e.g., 104A) surface may include a dedicated area on which a triple harmonic magnetic pattern is written for carrying out Wallace spacing measurements in a known manner. In some embodiments, the Wallace spacing measurements may be employed by elevator 140 along with other measurements/signals (e.g., signals from one or more piezoelectric sensors) to carry out fine positioning of HSA 138 to adjust z-height 152.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
 a base-deck;

at least one data storage disc located above the base-deck;
a shaft having an end coupled to the base-deck, the shaft extending perpendicular from the base-deck;
a head stack assembly (HSA) comprising at least one head gimbal assembly (HGA) having a first load beam and a first head positioned at a first end of the HSA and configured to interact with a first surface of the at least one data storage disc, the HSA further comprising a second end that is movably mounted on the shaft;
a first sensor on the HSA configured to detect close proximity or contact between a lift tab of the HGA and an end of a ramp of the data storage device and responsively provide a first feedback signal; and
an elevator configured to linearly move the HSA along the shaft to adjust a distance between the first load beam and the first surface of the at least one data storage disc in response to receiving the first feedback signal.

2. The data storage device of claim 1 and wherein the first sensor is a piezoelectric sensor that comprises a micro-actuator coupled to the HGA.

3. The data storage device of claim 1 and further comprising:
the at least one data storage disc having an outer diameter (OD);
an actuator coupled to the HSA and configured to move the HSA relative to the shaft;
wherein the ramp is configured for supporting the lift tab of the HGA, which is positioned proximate to the first head, when the first head is moved away from the at least one data storage disc, the ramp having a front end that is located adjacent to the OD; and
wherein:
the first feedback signal is indicative of close proximity, or contact, between the lift tab proximate to the first head and the front end of the ramp when the first head is carrying out a read or write operation on the first surface of the at least one data storage disc near the OD.

4. The data storage device of claim 3 and wherein:
the ramp is a split ramp having a first ramp portion including the front end that is adjacent to the OD and a second ramp portion adjacent to the first ramp portion, such that the first ramp portion is between the second ramp portion and the OD; and
the elevator is configured to move both the HSA and the second ramp portion in unison.

5. The data storage device of claim 1, comprising a second sensor configured as a piezoelectric sensor coupled to the first head.

6. The data storage device of claim 5 and wherein a second feedback signal is obtained from the piezoelectric sensor when the first head interacts with the first surface of the at least one data storage disc.

7. The data storage device of claim 1, wherein the HSA comprises:
a second HGA having a second load beam and a second head positioned at the first end of the HSA and configured to interact with a second surface of the at least one data storage disc, the second surface being opposite the first surface;
wherein the first feedback signal is associated with the first HGA, and a second feedback signal configured to be received by the elevator is associated with a second sensor of the second HGA.

8. The data storage device of claim 7 and wherein the second sensor comprises a piezoelectric sensor.

9. The data storage device of claim 8 and wherein the piezoelectric sensor comprises a micro-actuator coupled to the second HGA.

10. The data storage device of claim 8 and wherein the piezoelectric sensor is coupled to the second head.

11. A data storage device comprising:
a base-deck;
at least one data storage disc located above the base-deck;
a shaft having an end coupled to the base-deck, the shaft extending perpendicular from the base-deck;
a head stack assembly (HSA) comprising at least one head gimbal assembly (HGA) having a load beam and a head positioned at a first end of the HSA and configured to interact with a surface of the at least one data storage disc, the HSA further comprising a second end that is movably mounted on the shaft;
a sensor located on the HSA and configured to detect close proximity or contact between a lift tab of the HGA and an end of a ramp of the data storage device and responsively provide a feedback signal; and
an elevator configured to linearly move the HSA along the shaft to adjust a distance between the load beam and the surface of the at least one data storage disc in response to receiving a Wallace spacing feedback signal and the feedback signal from the sensor.

12. The data storage device of claim 11 and wherein the sensor comprises a piezoelectric sensor on the HSA.

13. The data storage device of claim 12 and wherein the piezoelectric sensor comprises a micro-actuator coupled to the HGA.

14. The data storage device of claim 13 and further comprising:
the at least one data storage disc having an outer diameter (OD);
an actuator coupled to the HSA and configured to move the HSA relative to the shaft;
wherein the ramp is configured for supporting the lift tab of the HGA, which is positioned proximate to the head, when the head is moved away from the at least one data storage disc, the ramp having a front end that is located adjacent to the OD; and
wherein
the feedback signal from the micro-actuator is indicative of close proximity, or contact, between the head and the front end of the ramp when the head is carrying out a read or write operation on the surface of the at least one data storage disc near the OD.

15. The data storage device of claim 14 and wherein:
the ramp is a split ramp having a first ramp portion including the front end that is adjacent to the OD and a second ramp portion adjacent to the first ramp portion, such that the first ramp portion is between the second ramp portion and the OD; and
the elevator is configured to move both the HSA and the second ramp portion in unison.

* * * * *